United States Patent [19]
Russell

[11] 3,718,280
[45] Feb. 27, 1973

[54] FLUID PRESSURE TRANSMITTER AND SYSTEM THEREFOR

[75] Inventor: William J. Russell, Malvern, Pa.

[73] Assignee: Robertshaw Controls Company, Richmond, Va.

[22] Filed: March 3, 1971

[21] Appl. No.: 120,549

[52] U.S. Cl. ..................... 236/44 R, 73/522, 236/86
[51] Int. Cl. ................................................. B01f 3/02
[58] Field of Search .......... 236/44 R, 86, 87, 101, 99; 337/300; 73/522

[56] References Cited

UNITED STATES PATENTS

| | | | |
|---|---|---|---|
| 1,872,433 | 8/1932 | Evans | 236/101 |
| 1,976,930 | 10/1934 | Evans et al. | 236/101 |
| 2,298,827 | 10/1942 | Joesting | 236/87 X |
| 2,363,595 | 11/1944 | Joesting | 236/87 X |
| 2,651,468 | 9/1953 | Joesting | 236/87 X |
| 3,064,476 | 11/1962 | Naples | 236/87 UX |

*Primary Examiner*—William E. Wayner
*Attorney*—Candor, Candor & Tassone

[57] ABSTRACT

A fluid pressure transmitter having a flapper valve lever pivotally carried by a frame and having an end thereof for controlling a valve seat whereby the position of the end of the lever relative to the valve seat determines the degree of fluid flow through the valve seat. A first spring is carried by the frame and is operatively interconnected to the flapper lever to tend to move the end thereof in one direction relative to the valve seat. An actuating lever is pivotally carried by the frame and has opposed ends. A condition responsive device is operatively interconnected to one of the ends of the actuating lever to pivot the actuating lever in relation to the condition sensed thereby and a second spring is interconnected to the other end of the actuating lever and to the end of the flapper lever to control movement of the end of the flapper lever relative to the valve seat in relation to pivoting movement of the actuating lever by the condition responsive device. A conduit means is utilized to convey the fluid flow from the valve seat to a position remote from the condition responsive device so that the condition responsive device will not be responsive to the characteristics of the fluid flow through the valve seat.

30 Claims, 6 Drawing Figures

PATENTED FEB 27 1973

INVENTOR.
WILLIAM J. RUSSELL

BY Cauden, Cauden & Tassme

HIS ATTORNEYS

INVENTOR.
WILLIAM J. RUSSELL

FLUID PRESSURE TRANSMITTER AND SYSTEM THEREFOR

This invention relates to a fluid pressure transmitter and to a pneumatic control system utilizing such a pressure transmitter or the like.

It is well known that fluid pressure transmitters have been provided to be responsive to the relative humidity of a surrounding area to vary the fluid pressure in the system in relation to the sensed relative humidity whereby a pneumatic control system will add moisture to the particular environment utilizing the relative humidity sensor or decrease the moisture content thereof so as to tend to maintain a desired and selected relative humidity in the surrounding area, such as in a building, house or the like.

Accordingly, it is a feature of this invention to provide an improved fluid pressure transmitter for such control purposes or the like, the fluid pressure transmitter of this invention having a lever arrangement for accurately controlling the bleed valve seat of the transmitter.

Another feature of this invention is to provide a fluid pressure transmitter having means for isolating the condition responsive means from the air flow through the bleed valve seat so that the condition responsive means will not be affected by the characteristics of the fluid flow through the bleed valve seat.

In particular, one embodiment of the fluid pressure transmitter of this invention comprises a frame carrying a valve seat and a pivotally mounted flapper lever having an end for controlling the valve seat whereby the position of the end of the lever relative to the valve seat determines the degree of fluid flow through the valve seat. A first spring is carried by the frame and is operatively interconnected to the flapper lever to tend to move the end of the flapper lever in one direction relative to the valve seat. An actuating lever is pivotally carried by the frame and has opposed ends, one of which is interconnected to a condition responsive means that tends to pivot the lever in relation to the condition sensed thereby. A second spring is interconnected to the other end of the actuating lever and to the end of the flapper lever to control movement of the end of the flapper lever relative to the valve seat in relation to pivoting movement of the actuating lever caused by the condition responsive device. A conduit arrangement or member is fluidly interconnected to the valve seat so as to convey fluid flow therethrough to an outlet of the conduit means that is disposed remote from the condition responsive device so that the condition responsive device is not affected by the characteristics of the fluid flow through the valve seat.

Accordingly, it is an object of this invention to provide an improved fluid transmitter having one or more of the novel features set forth above or hereinafter shown or described.

Another object of this invention is to provide an improved pneumatic control system utilizing such a transmitter or the like.

Other objects, uses and advantages of this invention are apparent from a reading of this description which proceeds with reference to the accompanying drawings forming a part thereof and wherein:

FIG. 1 is a fragmentary, perspective view illustrating the fluid transmitter of this invention mounted on a wall or the like.

Figure 1:
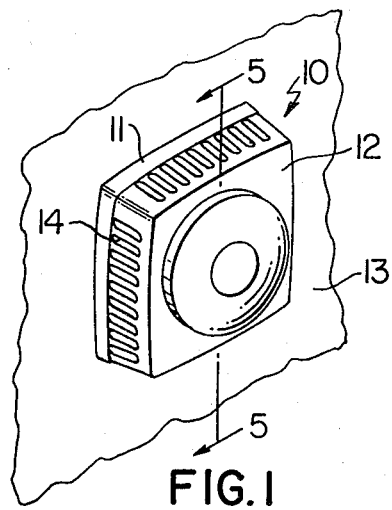

While the various features of this invention are hereinafter described and illustrated as being particularly adapted to provide a fluid pressure transmitter that is responsive to the relative humidity of the air surrounding such transmitter, it is to be understood that the various features of this invention can be utilized singly or in any combination thereof to provide a fluid pressure transmitter for any other desired purpose.

Also, while this invention is hereinafter described in connection with a fluid pressure system, it is to be understood that the transmitter of this invention can be utilized with a vacuum system, if desired.

Therefore, this invention is not to be limited to only the embodiments illustrated in the drawings, because the drawings are merely utilized to illustrate one of the wide variety of uses of this invention.

Figure 2:
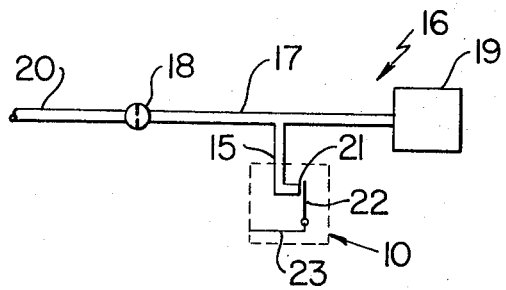
FIG. 2 is a schematic view illustrating the fluid transmitter of this invention as utilized in the pneumatic control system of this invention.
Figure 3:
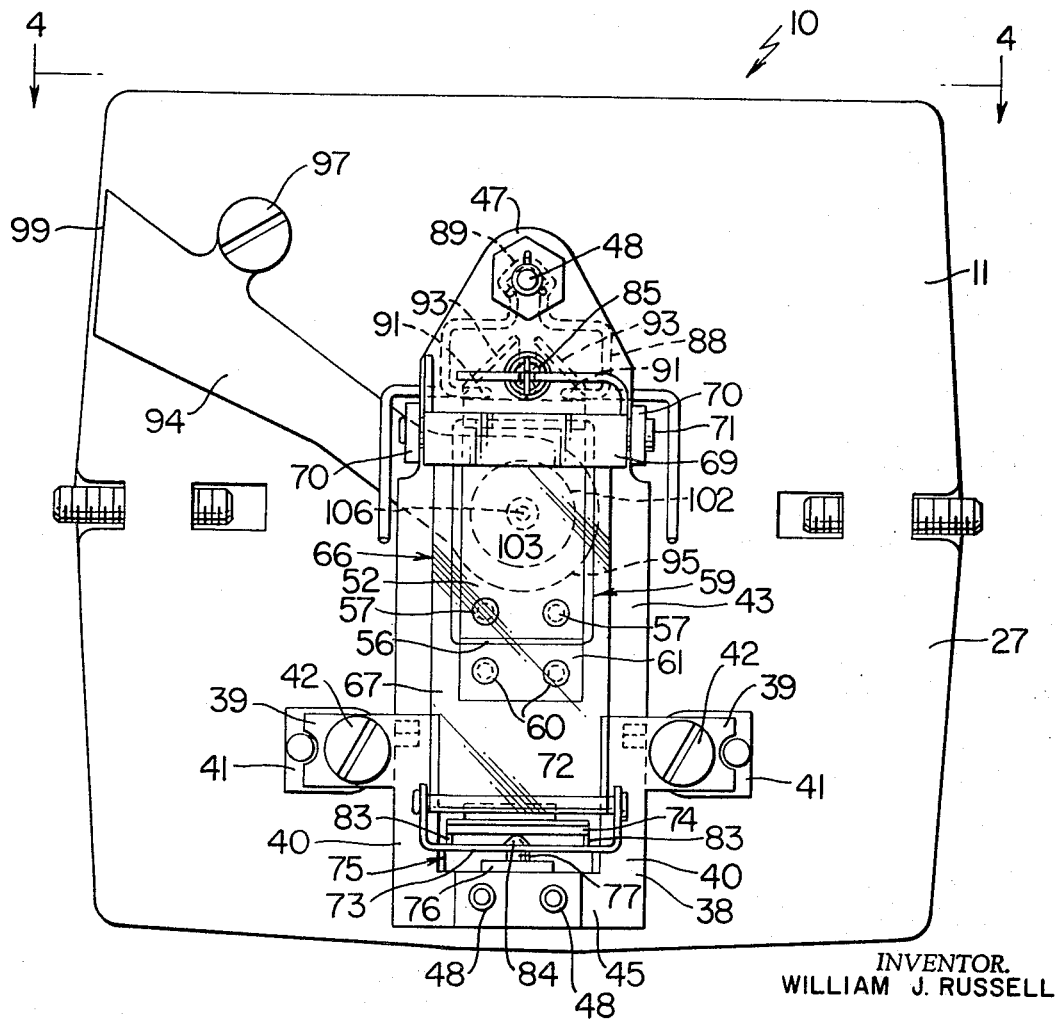
FIG. 3 is an enlarged, front view of the fluid transmitter of FIG. 1 with the cover member thereof removed.
Figure 4:
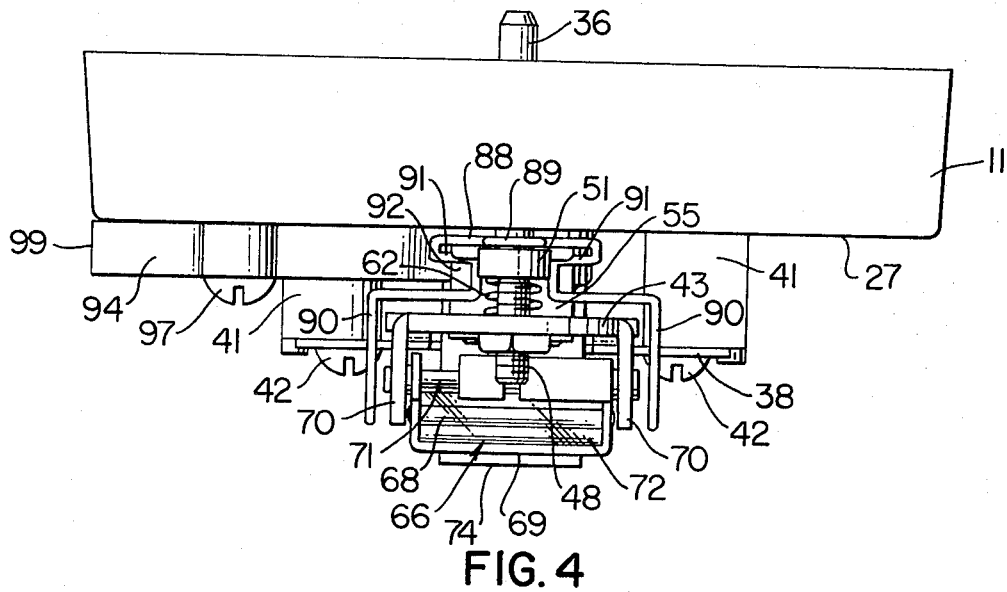
FIG. 4 is a top view of the fluid transmitter illustrated in FIG. 3 and is taken substantially in the direction of the arrows 4—4 in FIG. 3.

Referring now to FIGS. 1 and 2, the improved fluid pressure transmitter of this invention is generally indicated by the reference numeral 10 and comprises a base or frame means 11 carrying a cover member 12 detachably secured thereto in any desired manner whereby the base or frame 11 of the transmitter 10 is adapted to be mounted to a wall surface 13 of a room or the like which is to have the relative humidity thereof regulated by the transmitter 10, the transmitter 10 sensing the relative humidity of the air of the room by permitting the air thereof to be circulated through the interior of the transmitter 10 by means of suitable openings or slots 14 formed in the cover member 12 about its periphery.

The fluid pressure transmitter 10 of this invention is adapted to have an inlet 15 thereof fluidly interconnected into the pneumatic control system 16 illustrated in FIG. 2 by being fluidly interconnected to a conduit means 17 intermediate a restrictor 18 in the conduit means 17 and a pneumatically controlled device 19 that controls the input and/or removal of moisture of the air that is to be circulated in the room containing the transmitter 10 in relation to the value of the fluid pressure in the conduit means 17 leading to the controlled device 19.

In particular, supply pressure is delivered into left-hand end 20 of the conduit means 17 and passes through the restrictor 18 to the controlled device 19. However, the fluid pressure transmitter 10 of this invention includes a valve seat means 21 fluidly interconnected to the inlet 15 and having a flapper lever 22 controlling the degree of bleed openness of the valve seat 21 to the atmosphere to permit the fluid pressure in the conduit means 17 intermediate the restrictor 18 and the controlled device 19 to bleed to the atmosphere and thus have the pressure thereof regulated by the position of the flapper lever 22 relative to the valve seat 21. The flapper lever 22 has its position relative to the valve seat 21 regulated by a relative humidity sensing device 23 in a manner hereinafter described so that if the relative humidity in the room containing the transmitter 10 increases beyond a selected setting for the transmitter 10, the flapper valve lever 22 is moved toward the valve seat 21 so that the value of the fluid pressure in the conduit means 17 leading to the controlled device 19 correspondingly increases to cause the controlled device 19 to lower the moisture content in the air being circulated in the room containing the transmitter 10. As the relative humidity being sensed by the transmitter 10 decreases and falls below the selected value, the relative humidity sensing device 23 causes the lever 22 to move away from the valve seat 21 so that the pressure in the conduit means 17 leading to the controlled device 19 correspondingly decreases whereby the decreased pressure being delivered to the controlled device 19 causes the controlled device 19 to increase the moisture content in the air being circulated through the room containing the transmitter 10. Thus, it can be seen that the transmitter 10 tends to maintain the relative humidity in the room containing the same at the selected relative humidity setting of the transmitter 10 by positioning the flapper lever 22 relative to the valve seat means 21 in relation to the degree of relative humidity sensed by the transmitter 10.

The details of the fluid pressure transmitter 10 of this invention will now be described and reference is made to FIGS. 3–6 wherein the base or frame means 11 carries the valve seat means 21 which is defined by a valve seat member 24 disposed in an opening 25 passing through the base 11 and being fixed thereto by having an enlarged shoulder 26 thereof abut against one side 27 of the base 11 while the other end 28 thereof is threadedly coupled to a nipple extension member 29 that has its end 30 abutting against the other side 31 of the base 11 so that the base 11 is clamped between the valve seat member 24 and the nipple extension member 29. The valve seat member 24 has a frusto-conical valve seat 32 interrupting a flat surface 33 thereof and is disposed in fluid communication with a passage means 34 passing therethrough and disposed in fluid communication with a passage means 35 formed through a nipple extension 36 of the nipple extension member 29. In this manner, the nipple extension 36 is adapted to be coupled into the pneumatic control system 16 of FIG. 2 by having the nipple extension 36 telescoped within a flexible conduit that leads to the conduit 17 of FIG. 2 whereby the nipple 36 defines the inlet 15 of FIG. 2.

If desired, suitable porous and air filtering members 37 can be disposed between the valve seat member 24 and nipple extension member 29 for filtering the fluid flow as the same passes from the control system 16 to the valve seat 32.

Figure 5:
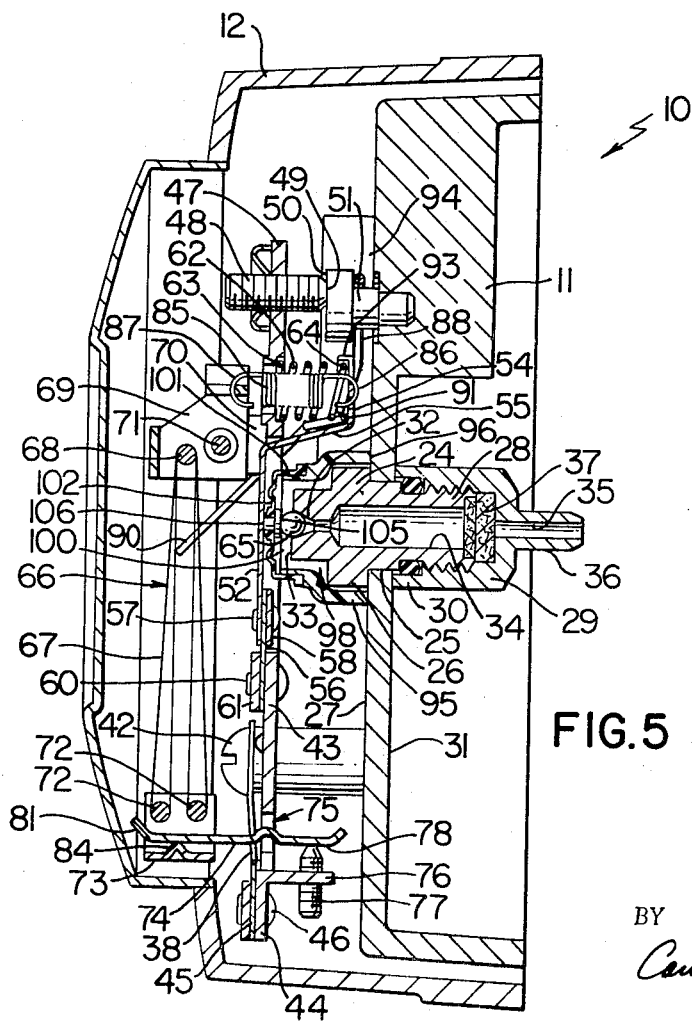
FIG. 5 is an enlarged, cross-sectional view taken on line 5—5 of FIG. 1.
Figure 6:
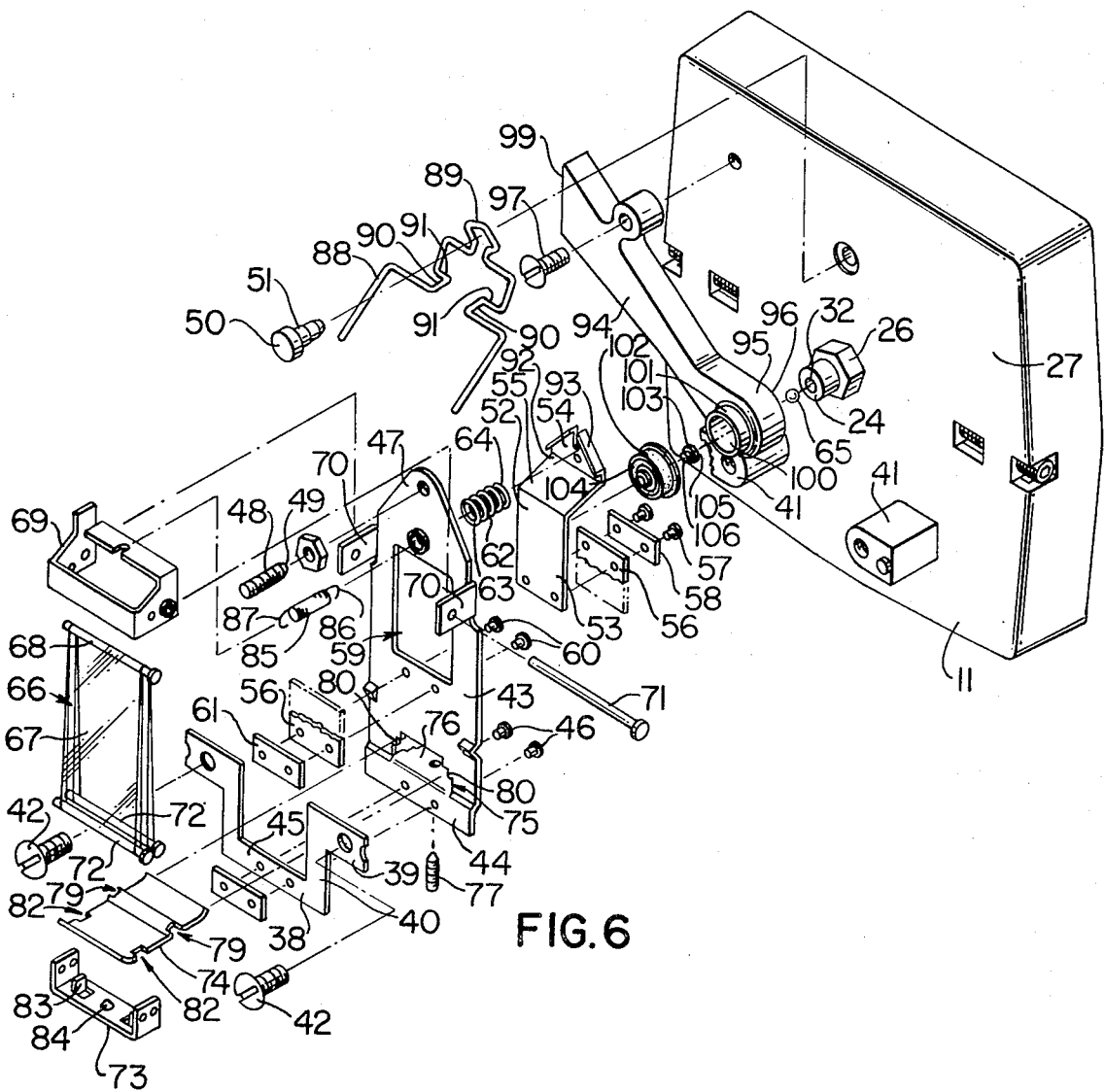
FIG. 6 is an exploded, perspective view of the various parts of the fluid pressure transmitter of this invention.

A U-shaped spring bracket member 38 has outwardly directed ears 39 at the free ends of the legs 40 thereof secured to post means 41 of the base 11 by threaded fastening members 42 to support an adjustable lever 43 above the surface 27 of the frame or base 11 in the manner illustrated in FIGS. 5 and 6 and tending to move the lever 43 in a clockwise direction in FIG. 5. In particular, the adjustable lever 43 has one end 44 thereof secured to the cross member 45 of the U-shaped spring bracket 38 by rivets 46 or the like and has its other end 47 adjustably carrying a threaded adjusting member 48 having an end 49 for bearing against a flat surface 50 of a button-like extension 51 carried by the frame 11 under the force of the spring bracket 38 whereby rotation of the adjusting member 48 will vary the position of the end 47 of the adjustable lever 43 relative to the valve seat 32 for calibration purposes as will be apparent hereinafter to select the desired relative humidity setting for the transmitter 10.

The flapper valve lever 22 of FIG. 2 is designated by the reference numeral 52 in FIGS. 3–6 and has a first flat section 53 interconnected to a second flat section 54 by an angled flat section 55 with the sections 53 and 54 being parallel with each other but disposed out of the plane of each other by the angled section 55.

The section 53 of the flapper lever 52 is pivotally mounted to the adjustable lever 43 by a flexible member 56 secured at one end thereof to the section 53 of the flapper lever 52 by suitable rivets 57 and a backup member 58 and to the adjustable lever 43 adjacent a rectangular cutout 59 thereof by suitable rivet means 60 and a suitable backup member 61 whereby the section 53 of the flapper lever 52 is mounted to span the cutout 59 of the adjustable lever 43 while the other section 54 thereof is disposed spaced from and below the end 47 of the adjustable lever 43.

A compression spring 62 is disposed between the end 47 of the adjustable lever 43 and the section 54 of the flapper lever 52 by having one end 63 engaging the adjustable lever 43 and the other end 64 engaging the section 54 with the compression spring 62 having a force tending to pivot the flapper lever 52 relative to the adjustable lever 43 in a direction to tend to move a ball valve member 65 in a direction to close the valve seat 32 in a manner hereinafter described.

The relative humidity sensing device 23 of FIG. 2 is generally indicated by the reference numeral 66 in FIGS. 3–6 and comprises a continuous nylon ribbon 67 looped around a pin 68 carried by a bell crank or actuating lever 69 pivotally mounted to outwardly turned arms 70 of the adjustable lever 43 by a pivot pin 71 and also looped around a pair of pins 72 carried by a retainer 73 which, in turn, is supported by a bimetallic ambient temperature compensating member 74.

In particular, the ambient temperature compensating member 74 projects through a cutout 75 formed in the adjustable member 43 by a section 76 thereof being bent out of the plane thereof, the bent or angled section 76 of the adjustable lever 43 carrying a threaded adjusting member 77 for engaging against the lower end 78 of the bimetallic ambient temperature compensating member 74 which is pivoted to the adjustable lever 43 by having a pair of opposed notches 79 thereof respectively receiving edge means 80 of the lever 43 which are defined at the cutout 75 thereof. The upper end 81 of the member 74 has another pair of notches 82 formed therein and respectively receiving angularly bent tangs 83 of the retainer 73 so that the retainer 73 will have an embossment or dimple 84 thereof bear against the end 81 of the member 74 to tend to pivot the member 74 in FIG. 5 in a clockwise direction with such pivoting movement being limited by the adjusting member 77 bearing against the lower end 78 of the member 74.

In this manner, the bimetallic ambient temperature compensating member 74 will warp in a direction to take up or compensate for any change in the length of the nylon ribbon 67 caused solely through ambient temperature changes so that the nylon ribbon 67 will only, in effect, change its effective length in relation to a change in relative humidity being sensed thereby so as to accurately control the position of the valve member 65 relative to the valve seat 32 in relation to the relative humidity whereby ambient temperature variations adjacent the transmitter 10 will not affect the opening and closing of the valve seat 32.

A tension spring 85 is disposed within the compression spring 62 and has one end 86 hooked to the section 54 of the flapper lever 52 and the other end 87 thereof hooked to the bell crank or actuating lever 69 so that the tension spring 85 operatively interconnects the condition sensing device 66 to the flapper lever 52 for a purpose hereinafter described.

It was found that for various pressure ranges being controlled by the transmitter 10 of this invention, the flapper lever 52 tended to vibrate at the lower end of the operating pressure range whereby a wire member 88 is bent in such a manner that a loop 89 thereof loosely passes around the button 51 to secure the wire member 88 to the control device 10 while the opposed legs 90 thereof have bent portions 91 for resting on the section 54 of the flapper lever 52 in the region of the reference numerals 92 and adjacent bent reinforcing parts 93 thereof to tend to dampen any adverse vibration of the flapper lever 52 when controlling the valve member 32 to provide a lower operating pressure for the control system 16.

As previously stated, one of the features of the fluid pressure transmitter of this invention is to provide means for preventing the fluid flow through the valve seat 32 from adversely affecting the sensing condition of the temperature sensing device 66 of the relative humidity sensing device 66. Accordingly, a unique conduit or chute member 94 is provided and has an end 95 for being concentrically disposed about the valve seat member 24 while having its under side 96 held in substantially sealed relation against the surface 27 of the base or frame element 11 by a threaded fastening member 97 whereby the chute member 94 cooperates with the surface 27 of the base 11 to define a passage means 98 that leads from the valve seat 32 to an outer open end 99 of the conduit member 94. The chute or conduit member 94 has a circular opening 100 at the outer end of a tubular extension 101 thereof that is concentrically disposed about the valve seat member 24 and is closed by a cup-shaped, flexible diaphragm member 102 telescoped over the tubular extension 101 and held thereon by a press fit relation between the tubular extension 101 and the cup-shaped diaphragm member 102. The cup-shaped diaphragm member 102 carries an abutment member 103 on the closed end wall 104 thereof for engaging against the ball valve member 65 on one side 105 thereof and the section 53 of the flapper valve member 52 on the other side 106 thereof whereby movement of the flapper valve lever 52 controls the position of the ball valve member 65 relative to the valve seat 32 as will be apparent hereinafter.

In particular, since there is a fluid pressure in the passage 34 of the valve seat member 24, this fluid pressure tends to move the ball valve member 65 away from the valve seat 32 at all times so that the ball 65 is disposed against the diaphragm member 103 and holds the same against the section 53 of the flapper lever 52 to follow the movement thereof.

Since the outlet 99 of the chute or conduit member is disposed remote from the relative humidity sensing device 66, any fluid flow out of the end 99 of the conduit means 44 resulting from a bleed of fluid through the opened valve seat 32 will be directed out of the openings 14 of the cover member 12 of the device of the transmitter 10 so that the characteristics of the fluid of the system 16 will not affect the sensing condition of the ribbon 67.

From the above, it can be seen that the fluid pressure transmitter 10 of this invention can be made from a relatively small number of parts adapted to be readily assembled together to produce a relative humidity, fluid pressure transmitter adapted to accurately control a pneumatic system in a manner now to be described.

Assuming that the adjusting member 48 for the adjustable lever 43 have been set at a desired position thereof for causing the transmitter 10 to maintain the controlled device 19 to provide a desired relative humidity, the flapper lever 52 has positioned the ball valve member 65 relative to the seat 32 so that the bleed of fluid through the valve seat 32 to the atmosphere maintains the pressure in the conduit 17 at such a pressure that the controlled device 19 is maintaining the room at the relative humidity as set by the transmitter 10.

However, should an increase or decrease, as the case may be, occur in the relative humidity being sensed by the nylon ribbon 67, the nylon ribbon 67 changes its effective length to cause the bell crank or actuating lever 69 to pivot in either a clockwise or counterclockwise direction. Assuming that the lever 69 is pivoted in a counterclockwise direction in FIG. 5, such movement of the lever 69 pulls on the end 87 of the tension spring 85 to tend to move the flapper lever 52 in a counterclockwise direction in opposition to the force of the compression spring 62 whereby the portion 53 of the flapper lever 52 moves away from the valve seat 32 to permit the fluid pressure in the passage means 34 of the valve seat member 24 and acting against the ball valve member 65 to move the ball valve member 65 away from the valve seat 32 with the flapper lever 52 to open the valve seat 32 to a greater extent so that the bleed of fluid pressure from the conduit 17 to the atmosphere out through the more opened valve seat 32 increases to lower the pressure value in the conduit means 17 leading to the controlled device 19 whereby the controlled device 19 will decrease or increase, as the case may be, the moisture content in the air being supplied to the room containing the transmitter 10.

Conversely, should the relative humidity sensing device 66 cause the lever 69 to move in a clockwise direction, such movement of the lever 69 reduces the force of the tension spring 85 tending to pull on the flapper lever 52 so that the compression spring 62 moves the flapper lever 52 toward the valve seat 32 and, thus, moves the ball valve member 65 therewith to progressively close the valve seat 32 so that the pressure value in the conduit means 17 leading to the controlled device 19 correspondingly increases and thereby causes the controlled device 19 to increase or decrease, as the case may be, the moisture content of the air being delivered to the room containing the transmitter 10.

Thus, it can be seen that the fluid pressure transmitter 10 of this invention is adapted to accurately control the position of the ball valve member 65 relative to the valve seat 32 to control the degree of air bleed therethrough so as to tend to maintain a pressure value in the conduit 17 in relation to a desired relative humidity setting of the control device 10.

Accordingly, it can be seen that this invention not only provides an improved fluid pressure transmitter, but also this invention provides a pneumatic control system utilizing such a fluid pressure transmitter or the like.

While the form of the invention now preferred has been disclosed as required by the patent statutes, other forms may be utilized, all coming within the scope of the claims which follow.

What is claimed is:

1. A fluid pressure transmitter comprising frame means, valve seat means carried by said frame means, a flapper lever pivotally carried by said frame means and having an end means for controlling said valve seat means whereby the position of said end means relative to said valve seat means determines the degree of fluid flow through said valve seat means, first spring means carried by said frame means and being operatively interconnected to said flapper lever to tend to move said end means to one of its pivoted positions relative to said valve seat means, an actuating lever pivotally carried by said frame means and having opposed ends, a condition responsive means operatively interconnected to one end of said actuating lever to pivot said lever in relation to the condition sensed thereby, and second spring means interconnected to the other end of said actuating lever and to said end means of said flapper lever to control movement of said end means relative to said valve seat means in relation to pivoting movement of said actuating lever by said condition responsive means.

2. A fluid pressure transmitter as set forth in claim 1 wherein said condition responsive means is a humidity sensor.

3. A fluid pressure transmitter as set forth in claim 2 wherein said humidity sensor comprises an expandible and contractible ribbon having opposed end means one of which is interconnected to said one end of said actuating lever and the other end means being operatively interconnected to said frame means.

4. A fluid pressure transmitter as set forth in claim 3 wherein an ambient temperature compensating member operatively interconnects said other end means of said ribbon to said frame means.

5. A fluid pressure transmitter as set forth in claim 1 wherein an adjustable lever is carried by said frame means, said actuating lever being pivotally mounted to said adjustable lever.

6. A fluid pressure transmitter as set forth in claim 5 wherein said actuating lever is pivotally mounted to said adjustable lever by a leaf spring.

7. A fluid pressure transmitter as set forth in claim 5 wherein said first spring means is disposed between said adjustable lever and said actuating lever.

8. A fluid pressure transmitter as set forth in claim 7 wherein said first spring means is a compression spring and wherein said second spring means is a tension spring.

9. A fluid pressure transmitter as set forth in claim 1 wherein a movable valve member is disposed adjacent said valve seat means, said end means of said actuating lever being operatively associated with said valve member to position the same relative to said valve seat means.

10. A fluid pressure transmitter as set forth in claim 9 wherein a flexible diaphragm is carried by said frame means and is disposed between said valve member and said end means of said actuating lever.

11. A fluid pressure transmitter as set forth in claim 1 wherein conduit means is carried by said frame means and is disposed in fluid communication with said valve seat means, said conduit means having outlet means for venting the fluid flow through said valve seat means to an area remote from said condition responsive means.

12. A fluid pressure transmitter as set forth in claim 11 wherein said conduit means includes a flexible diaphragm, a valve member disposed on one side of said diaphragm for opening and closing said valve seat means, said end means of said flapper lever acting on the other side of said diaphragm to control the position of said valve member relative to said valve seat means.

13. A fluid pressure transmitter as set forth in claim 12 wherein said conduit means has an open ended tubular portion aligned with said valve seat means, said diaphragm closing said open end of said tubular portion.

14. A fluid pressure transmitter as set forth in claim 13 wherein said diaphragm is cup-shaped and is telescoped over said tubular portion of said conduit means to close said open end thereof.

15. A fluid pressure transmitter as set forth in claim 11 wherein said conduit means comprises a channel member having a open bottom and an open end, said open bottom being disposed against said frame means and being closed thereby while encompassing said valve seat means, said open end defining said outlet means of said conduit means.

16. In a fluid pressure control system comprising a source of pressure fluid, a fluid pressure operated device, and passage defining means interconnecting said source to said device, the improvement comprising a fluid pressure transmitter having a frame means, valve seat means carried by said frame means and being in fluid communication with said passage defining means, a flapper lever pivotally carried by said frame means and having an end means for controlling said valve seat means whereby the position of said end means relative to said valve seat means determines the degree of fluid flow through said valve seat means, first spring means carried by said frame means and being operatively interconnected to said flapper lever to tend to move said end means to one of its pivoted positions relative to said valve seat means, an actuating lever pivotally carried by said frame means and having opposed ends, a condition responsive means operatively interconnected to one end of said actuating lever to pivot said lever in relation to the condition sensed thereby, and second spring means interconnected to the other end of said actuating lever and to said end means of said flapper lever to control movement of said end means relative to said valve seat means in relation to pivoting movement of said actuating lever by said condition responsive means.

17. In a fluid pressure control system as set forth in claim 16, the further improvement wherein said condition responsive means is a humidity sensor.

18. In a fluid pressure control system as set forth in claim 17, the further improvement wherein said humidity sensor comprises an expandable and contractible ribbon having opposed end means one of which is interconnected to said one end of said actuating lever and the other end means being operatively interconnected to said frame means.

19. In a fluid pressure control system as set forth in claim 19, the further improvement wherein an ambient temperature compensating member operatively interconnects said other end means of said ribbon to said frame means.

20. In a fluid pressure control system as set forth in claim 16, the further improvement wherein an adjustable lever is carried by said frame means, said actuating lever being pivotally mounted to said adjustable lever.

21. In a fluid pressure control system as set forth in claim 20, the further improvement wherein said actuating lever is pivotally mounted to said adjustable lever by a leaf spring.

22. In a fluid pressure control system as set forth in claim 20, the further improvement wherein said first spring means is disposed between said adjustable lever and said actuating lever.

23. In a fluid pressure control system as set forth in claim 22, the further improvement wherein said first spring means is a compression spring and wherein said second spring means is a tension spring.

24. In a fluid pressure control system as set forth in claim 16, the further improvement wherein a movable valve member is disposed adjacent said valve seat means, said end means of said actuating lever being operatively associated with said valve member to position the same relative to said valve seat means.

25. In a fluid pressure control system as set forth in claim 24, the further improvement wherein a flexible diaphragm is carried by said frame means and is disposed between said valve member and said end means of said actuating lever.

26. in a fluid pressure control system as set forth in claim 16, the further improvement wherein conduit means is carried by said frame means and is disposed in fluid communication with said valve seat means, said conduit means having outlet means for venting the fluid flow through said valve seat means to an area remote from said condition responsive means.

27. In a fluid pressure control system as set forth in claim 26, the further improvement wherein said conduit means includes a flexible diaphragm, a valve member disposed on one side of said diaphragm for opening and closing said valve seat means, said end means of said flapper lever acting on the other side of said diaphragm to control the position of said valve member relative to said valve seat means.

28. In a fluid pressure control system as set forth in claim 27, the further improvement wherein said conduit means has an open ended tubular portion aligned with said valve seat means, said diaphragm closing said open end of said tubular portion.

29. In a fluid pressure control system as set forth in claim 28, the further improvement wherein said diaphragm is cup-shaped and is telescoped over said tubular portion of said conduit means to close said open end thereof.

30. In a fluid pressure transmitter as set forth in claim 26, the further improvement wherein said conduit means comprises a channel member having an open bottom and an open end, said open bottom being disposed against said frame means and being closed thereby while encompassing said valve seat means, said open end defining said outlet means of said conduit means.

* * * * *